US007437334B2

(12) United States Patent
Forman et al.

(10) Patent No.: US 7,437,334 B2
(45) Date of Patent: Oct. 14, 2008

(54) PREPARING DATA FOR MACHINE LEARNING

(75) Inventors: George H. Forman, Port Orchard, WA (US); Stephane Chiocchetti, Antony (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 136 days.

(21) Appl. No.: 11/004,318

(22) Filed: Dec. 3, 2004

(65) Prior Publication Data

US 2006/0179017 A1 Aug. 10, 2006

(51) Int. Cl.
*G06F 15/18* (2006.01)

(52) U.S. Cl. .............................. 706/12; 706/45; 709/224

(58) Field of Classification Search .................. 706/45, 706/12; 709/224
See application file for complete search history.

(56) References Cited

U.S. PATENT DOCUMENTS

| | | | |
|---|---|---|---|
| 5,845,285 A | 12/1998 | Klein | |
| 6,192,360 B1* | 2/2001 | Dumais et al. .................. | 707/6 |
| 6,701,333 B2 | 3/2004 | Suermondt et al. | |
| 6,728,689 B1 | 4/2004 | Drissi et al. | |
| 2002/0161761 A1 | 10/2002 | Forman et al. | |
| 2003/0018658 A1 | 1/2003 | Suermondt et al. | |
| 2004/0059697 A1* | 3/2004 | Forman ......................... | 706/46 |
| 2004/0064464 A1 | 4/2004 | Forman et al. | |
| 2004/0093315 A1 | 5/2004 | Carney | |
| 2004/0148266 A1* | 7/2004 | Forman ......................... | 706/46 |

OTHER PUBLICATIONS

George Forman "An Extensive Empirical Study of Feature Selection Metrics for Text Classification" The Journal of Machine Learning Research, vol. 3, Mar. 2003.*
A Pitfall and Solution in Multi-Class Feature Selection for Text Classification. G. Forman. ICML'04. HPL-2004-86. SpreadFx/Round-Robin method.*
An Extensive Empirical Study of Feature Selection Metrics for Text Classification. G. Forman. Special Issue on Variable and Feature Selection, Journal of Machine Learning Research, 3(Mar):1289-1305, 2003. HPL-2002-147R1, abstract only.*
Choose Your Words Carefully: An Empirical Study of Feature Selection Metrics for Text Classification. G. Forman. In the Joint Proceedings of the 13th European Conference on Machine Learning and the 6th European Conference on Principles and Practice of Knowledge Discovery in Databases (ECML/PKDD '02), Aug. 19-23, 2002. HPL-2002-88R2.*
An Introduction to Variable and Feature Selection. Isabelle Guyon, Andre Elisseeff; JMLR 3(Mar):1157-1182, 2003.*
Sin-Jae Kang, Sae-Bom Lee, Jong-Wan Kim and In-Gil Nam "Two Phase Approach for Spam Mail Filtering" Springer-Verlag Berlin Heidelberg 2004.*

(Continued)

*Primary Examiner*—David Vincent
*Assistant Examiner*—Lut Wong

(57) ABSTRACT

An apparatus and methods for feature selection and classifier builder are disclosed. The feature selection apparatus allows for removal of bias features. The classifier builder apparatus allows building a classifier using non-biased features. The feature selection methods disclosed teach how to remove bias features. The classifier builder methods disclosed teach how to build a classifier with non-biased features.

12 Claims, 10 Drawing Sheets

OTHER PUBLICATIONS

Huan Liu ("Evolving Feature selection" IEEE Intelligent systems 2005).*

Forman, George, H., et al., U.S. Appl. No. 11/004,317, filed Dec. 3, 2004 (23 pages).

Abstract of Bordley, R.F., et al., "Fuzzy Set Theory, Observer Bias and Probability Theory," *Fussy Sets Systems*, vol. 33, No. 3, 1 page (1989).

Abstract of Ejima, T., et al., "Biased Clustering Method for Partially Supervised Classification," *Proc SPIE Int Soc Opt Eng* vol. 3304, 2 pages (1998).

Abstract of Feelders, A.J., et al., "Learning from Biased Data Using Mixture Models," *KDD-96 Proceedings*, 1 page (1996).

Abstract of Hall, L.O., "Data Mining of Extreme Data Sets: Very Large and or/ Very Skewed Data Sets," *Proc IEEE Int Conf Syst Man Cybern*, vol. 1, 1 page (2001).

Abstract of Kayacik, H.G., et al., "On Dataset Biases In a Learning System with Minimum a priori Information for Instrusion Detection," *Proceedings on the 2nd Annual Conference on Communication Networks and Services Research*, 1 page (2004).

Abstract of SubbaNarasimha, P.N., et al., "Predictive Accuracy of Artifical Neural Networks and Multiple Regression in the Case of Skewed Data: Exploration of Some Issues" Expert Systems with Applications, vol. 19, No. 2, 1 page (2000).

Abstract of Zhu, H., et al., "Training Algorithm for Multilayer Neural Networks of Hard-Limiting Units with Random Bias," *IEICE Transactions on Fundamentals of Electronics, Communications, and Computer Sciences*, vol. E83-A, No. 6, 1 page (2000).

Buckley, J.J., "Training a Fuzzy Neural Net," *Proceedings of the 1994 1st International Conference of NAFIPS/IFIS/NASA*, pp. 73-77 (1994).

Ghosn, J., "Bias Learning, Knowledge Sharing," *IEEE Transactions on Neural Networks*, vol. 14, No. 4, pp. 748-765 (Jul. 2003).

Lisboa, P.J.G., et al., "Bias Reduction in Skewed Binary Classification with Bayesian Neural Networks," *Neural Networks*, vol. 13, pp. 407-410 (2000).

Snyders, S., et al., "What Inductive Bias Gives Good Neural Network Training Performance," *Proceedings of the International Joint Conference on Neural Networks*, 8 pages total (2000).

Sugiyama, M., et al., "Incremental Active Learning with Bias Reduction," *Proceedings of the International Joint Conference on Neural Networks*, 6 pages total (2000).

Tetko, I.V., "Associative Neural Network," Internet: <http://cogprints.org/1441/>, pp. 1-15 (2001).

Weiss, S.M., et al., *Predictive Data Mining, A Practical Guide*, pp. 74-78 (1997).

* cited by examiner

| LABELS | | FEATURE VECTORS | | | | |
|---|---|---|---|---|---|---|
| TYPE | CLASS | "FREE" | "PROJECT" | "LUNCH" | FRIEND'S NAME | "USER'S NAME" |
| FRIEND'S E-MAIL | SPAM | 1 | 0 | 0 | 1 | 0 |
| FRIEND'S E-MAIL | SPAM | 1 | 0 | 0 | 1 | 0 |
| FRIEND'S E-MAIL | SPAM | 1 | . | . | 1 | . |
| . | . | . | . | . | . | . |
| USER'S E-MAIL | NOT SPAM | 0 | 1 | 1 | 0 | 1 |
| USER'S E-MAIL | SPAM | 1 | 0 | 0 | 0 | 1 |
| USER'S E-MAIL | NOT SPAM | 1 | 1 | 1 | 0 | 1 |
| USER'S E-MAIL | NOT SPAM | 1 | 1 | 1 | 0 | 1 |
| . | . | . | . | . | . | . |

BAG OF WORDS MODEL
FIG. 1

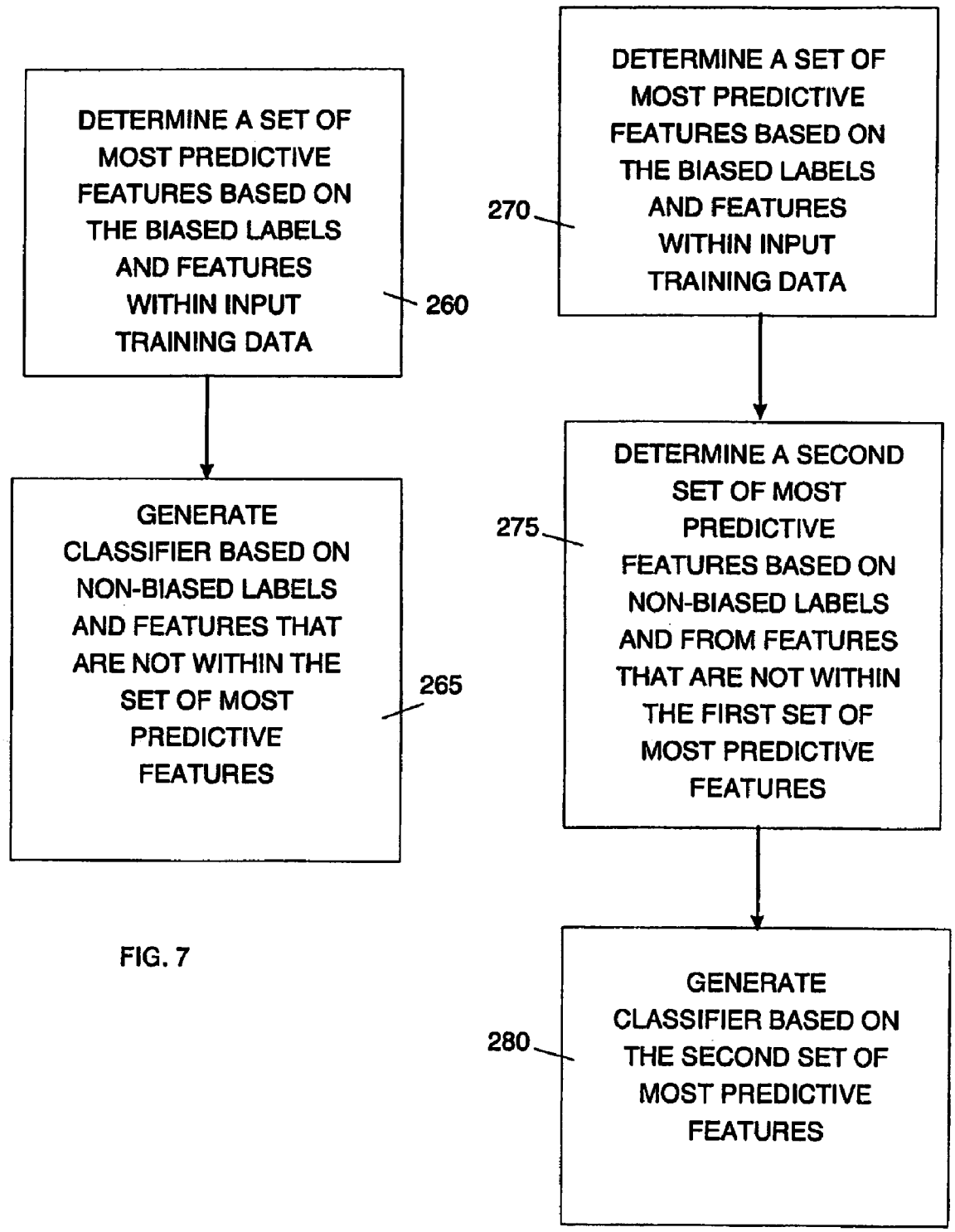

PREPARING DATA FOR MACHINE LEARNING

BACKGROUND

1. Field of Technology

The disclosure relates generally to machine learning and classification systems.

2. Glossary

The following definitions are provided merely to help readers generally to understand commonly used terms in machine learning, statistics, and data mining. The definitions are not designed to be completely general but instead are aimed at the most common case. No limitation on the scope of the invention (see claims section, infra) is intended, nor should any be implied.

"Data set" shall mean a schema and a set of "records" matching the schema; A "labeled data set" (or "training set") has each record explicitly assigned to a class. A single record is also sometimes referred to as a "data item," an "example," or a "case." A "label" is recorded knowledge about which class or data source the record belongs to (no ordering of "records" is assumed).

"Feature value" is an attribute and its value for a given record; "feature vector" or "tuple" shall mean a list of feature values describing a "record."

"Knowledge discovery" shall mean the non-trivial process of identifying valid, novel, potentially useful, and ultimately understandable patterns in data.

"Machine learning" (a sub-field of artificial intelligence) is the field of scientific study that concentrates on "induction algorithms" and other algorithms that can be said to learn; generally, it shall mean the application of "induction algorithms," which is one step in the "knowledge discovery" process.

"Model" shall mean a structure and corresponding interpretation that summarizes or partially summarizes a data set for description or prediction.

3. General Background

The volume of machine-readable data that is currently available, for example on the Internet, is growing at a rapid rate. In order to realize the potentially huge benefits of computer access to this data, the data may be classified into categories (or classes). Traditionally, such data has been classified manually by humans. As the amount of data has increased, however, manual data interpretation has become increasingly impractical. Recently, machine learning has been implemented to classify data automatically into one or more potential classes.

Machine learning (a sub-field of artificial intelligence) is the field of scientific study that concentrates on "induction algorithms" and other algorithms that can be said to learn. Machine learning encompasses a vast array of tasks and goals. Document categorization, news filtering, document routing, personalization, and the like, constitute an area of endeavor where machine learning may greatly improve computer usage. As one example, when using electronic mail (hereinafter "e-mail"), a user may wish the computer to identify and separate junk e-mails (hereinafter "SPAM e-mails") from the rest of the incoming e-mails. Machine learning for text classification is the cornerstone of document categorization, news filtering, document routing and personalization.

"Induction algorithms" (hereinafter "Inducer") are algorithms that take as input specific feature vectors (hereinafter "feature vectors") labeled with their assignments to categories (hereinafter "labels") and produce a model that generalizes data beyond the training data set. Most inducers generate/build a "model" from a training data set (hereinafter "training data") that can then be used as classifiers, regressors, patterns for human consumption, and input to subsequent stages of "knowledge discovery" and "data mining."

A classifier provides a function that maps (or classifies) data into one of several predefined potential classes. In particular, a classifier predicts one attribute of a set of data given one or more attributes. The attribute being predicted is called the label, and the attributes used for prediction are called descriptive attributes (hereinafter "feature vectors"). After a classifier has been built, its structure may be used to classify unlabeled records as belonging to one or more of the potential classes.

Many different classifiers have been proposed.

The potential is great for machine learning to categorize, route, filter and search for relevant text information. However, good feature selection may improve classification accuracy or, equivalently, reduce the amount and quality of training data needed to obtain a desired level of performance, and conserve computation, storage and network resources needed for future use of the classifier. Feature selection is a preprocessing step wherein a subset of features or attributes is selected for use by the induction step. Well-chosen features based on non-biased labels may improve substantially the classification accuracy, or equivalently, reduce the amount and quality of training data items needed to obtain a desired level of performance.

In general, induction algorithms generate more accurate classifiers when given larger training sets. For this reason, one would like to gather as many training examples together from free or inexpensive sources. Currently, however, when training data is included from other sources besides that of the intended target, the inducer can go astray and generate poor classifiers due to biased features within the training data.

BRIEF DESCRIPTION OF THE DRAWINGS

FIG. 1 is a table showing an exemplary "bag-of-words" modeling.

FIG. 3 is a flow diagram of an embodiment of a feature selection system of FIG. 2a.

FIG. 7 is a flow diagram of the classifier building system of FIGS. 2a and 6.

FIG. 8 is a flow diagram of the classifier building system of FIGS. 2b and 6.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

Eliminating biased features improves accuracy for biased datasets, and may be used to enable the use of additional inexpensive datasets without the loss of accuracy that would normally come from using biased datasets.

Figure 2A:
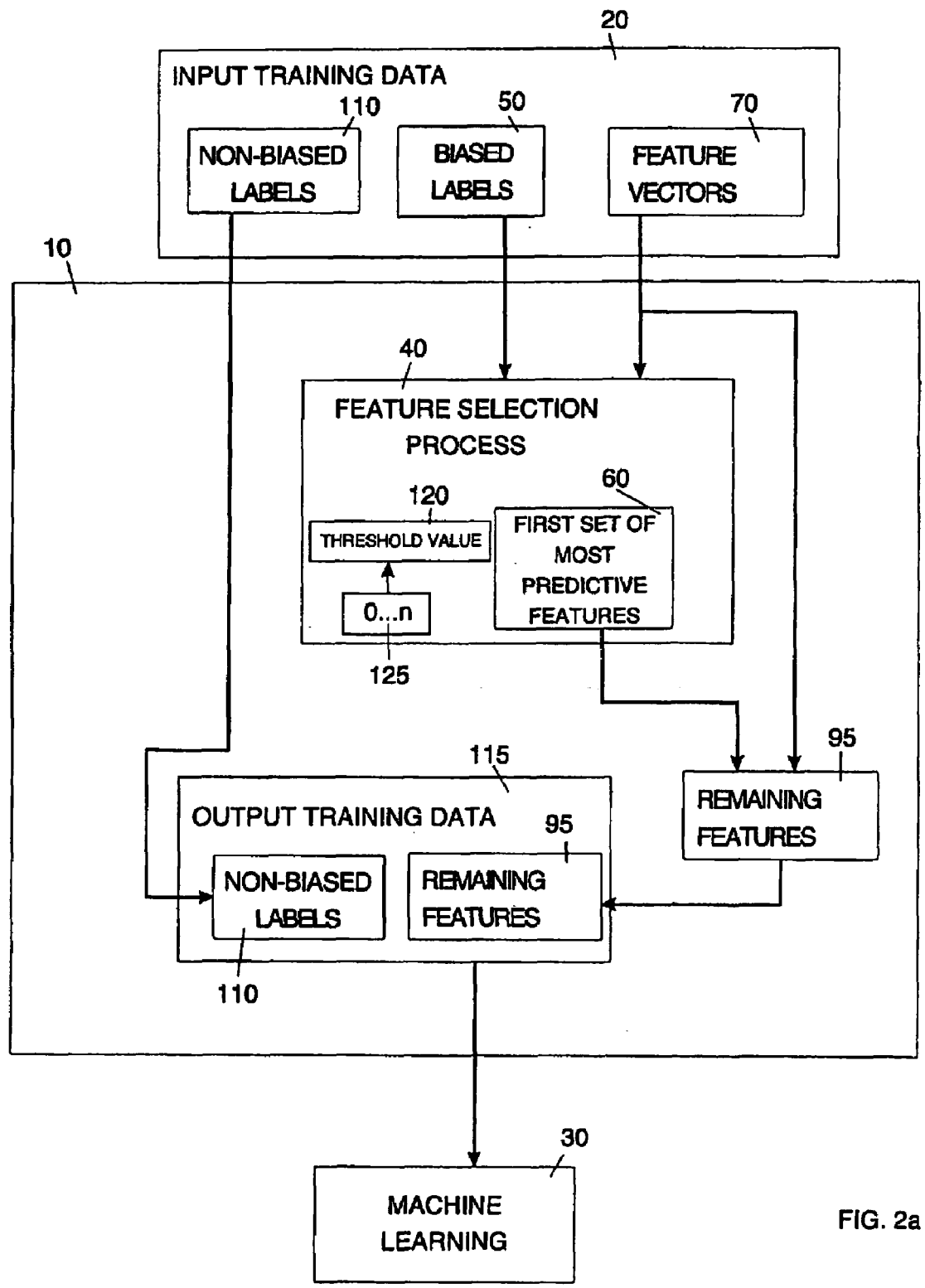
FIGS. 2a-c are block diagrams of an embodiment of a feature selection system.

Referring to FIGS. 1 and 2a, in one exemplary embodiment, a feature selection system 10 may prepare input training data 20 for machine learning phase 30 and may include a feature selection process 40 to determine with respect to the biased label 50 a set of most predictive features 60 within feature vectors 70 that make up the input training data 20. Feature selection process 40 may, for example, be an Information Gain algorithm or a Bi-Normal Separation algorithm. Input training data 20 may, for example, correspond to a database table shown in FIG. 1 containing columns of labels 80 and feature vectors 70 where the labels 80 may contain a biased label 50 and the feature vectors 70 may contain biased features 85 and 90.

For example, to build a classifier that is able to differentiate between SPAM and regular e-mail, a user would identify a modest number of training data for regular e-mail and SPAM, and then an inducer may learn the pattern and identify additional matches to separate the incoming e-mails. In such an e-mail classification, effective feature selection makes the learning task more accurate. The quality of the training data plays a big role in making the learning task more accurate.

In e-mail classification, a user may provide the data items that consist of, for example, the user's regular e-mails as examples of non-SPAM and perhaps a friend's junk e-mails as examples of SPAM. The training data, provided by the user, are reduced into feature vectors, typically a "bag-of-words model." A sample model is shown in FIG. 1, in tabular format which, in practice may have many more rows and columns. Each row represents the label and feature vector of a different e-mail. Each label column may identify a particular type or class of training data. Each feature column corresponds to a given word, e.g. the occurrence of the word "project" may be a useful feature in classifying non-SPAM. The number of potential words often exceeds the number of training data by an order of magnitude. Reducing training data into features is necessary to make the problem tractable for a classifier.

In the above example, all of the friend's e-mails are SPAM while most of the user e-mails are non-SPAM, so such biased features as 85 and 90 may wrongfully lead the machine learning to classify the newly incoming e-mails containing "Friend's name" as SPAM and the newly incoming e-mails containing "User's name" as non-SPAM e-mail. A similar problem arises even if the user's e-mail contains SPAM e-mail if there is significantly more SPAM e-mail from the friend.

To avoid such problems, a prior solution would have been for the user not to use the friend's free e-mail as examples of SPAM e-mail. Therefore the inability to use datasets from other free or inexpensive sources means either (1) having less training data, or (2) having to go to greater effort or expense to generate additional training examples from the intended target data source. Another somewhat obscure solution would have been for the user to go ahead and use the friend's free e-mail as long as the user also obtains additional examples of SPAM e-mail from other sources so that the inducer would not consider "Friend's Name" as a good predictive feature. However, once again this requires user's time and money to obtain additional training examples.

FIG. 1 is shown as an example for clarity reasons and in reality there may be many more biased label and biased features that are not shown presently.

Figure 3:
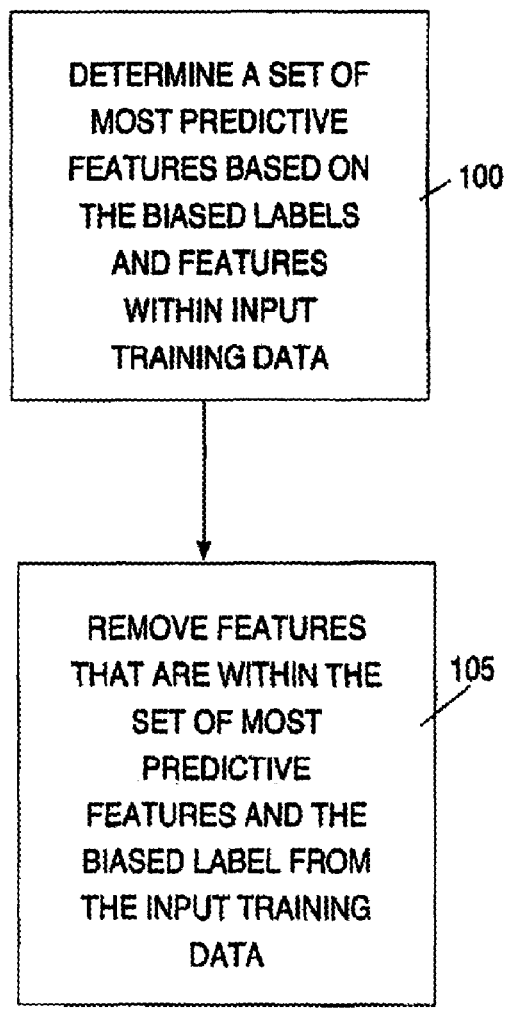

Referring to FIGS. 2a and 3, in operation, a set of most predictive features 60 may be determined based on the biased labels 50 and from the feature vectors 70 within the input training data 20 (step 100). Once the set of most predictive features 60, which in this example may contain biased features 85 and 90, is determined, the biased features 85, 90 and the biased labels 50 may be removed from the input training data 20 (step 105) and only the remaining features 95 and non-biased labels 110, if any, may make up the output training data 115 that may be input to machine learning phase 30. The remaining features 95 may contain features that are within the feature vectors 70 and are not within the set of most predictive features 60.

Referring to FIG. 2a, the threshold value 120 may be used to determine the number of features to be included within the set of the most predictive features 60. A threshold value 120 may be a single number that may be programmable. The set of most predictive features 60 may contain a threshold value 120 of features that may be removed from the feature vectors 70. So, for example, if the threshold value 120 were, for example, to be set to one-hundred-five (105), the set of most predictive features 60 would contain one-hundred-five (105) features that may be removed from the feature vectors 70.

Referring to FIG. 2a, in another exemplary embodiment, the single, programmable threshold value 120 may represent a predictiveness value of the features to be included within the set of the most predictive features 60. So, if the threshold value 120 were, for example, set to two-point-two (2.2), the set of most predictive features 60 would contain features with the predictiveness value of two-point-two (2.2) and above, as may be computed by an Information Gain, Bi-Normal Separation, or some other known manner method.

Figure 2B:
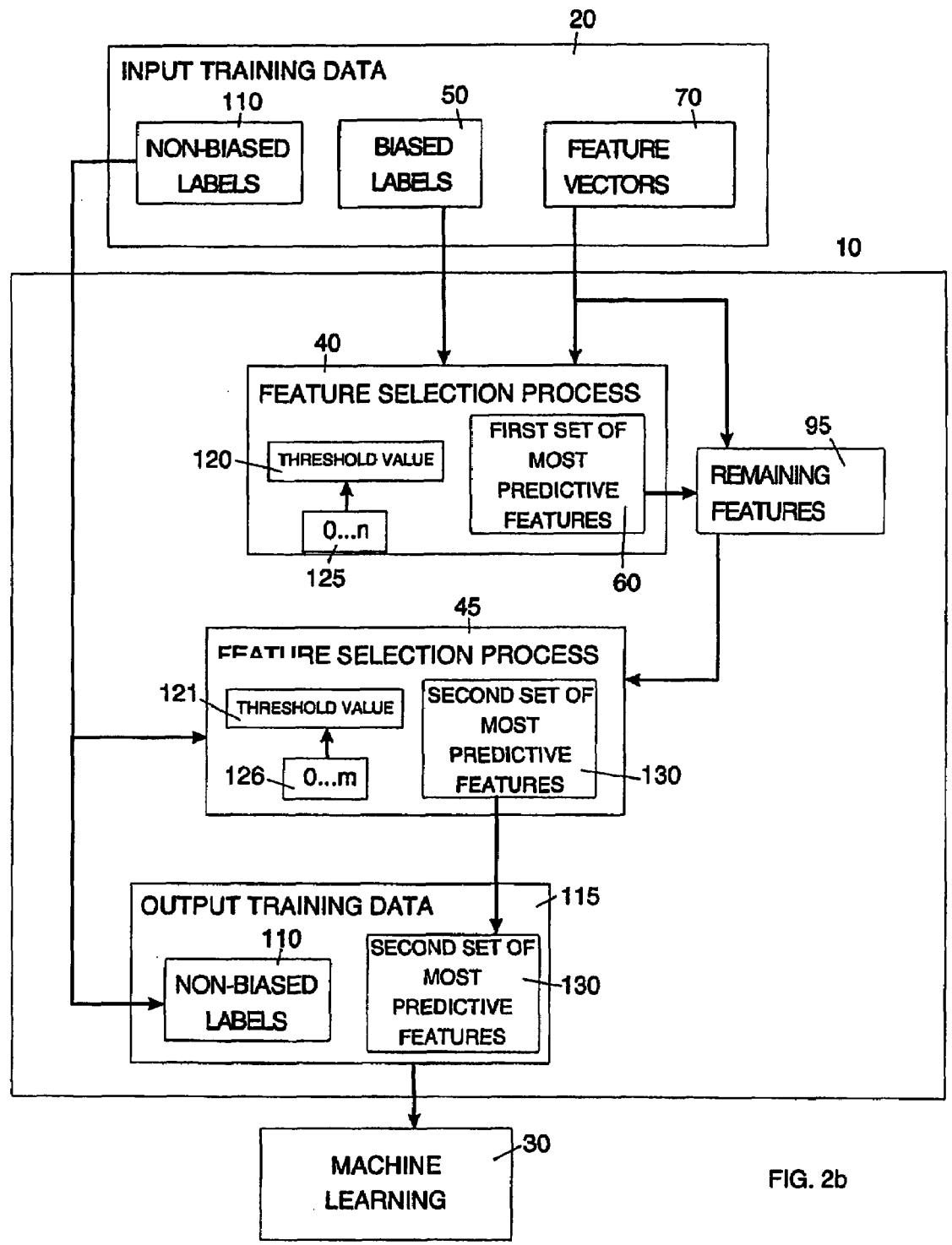

Referring to FIG. 2b, in another exemplary embodiment of the feature selection system 10, feature selection process 45 may determine a second set of the most predictive features 130 based on the non-biased labels 110 and from the remaining features 95. In this exemplary embodiment, the output training data 115 that may be input to machine learning phase 30, may comprise the non-biased labels 110 and the second set of most predictive features 130. Both feature selection processes 40 and 45 may be preformed by a single algorithm like, for example, an Information Gain algorithm or a Bi-Normal Separation algorithm. Remaining features 95 may contain features that are within feature vectors 70 and are not within features within the set of most predictive features 60.

Figure 4:
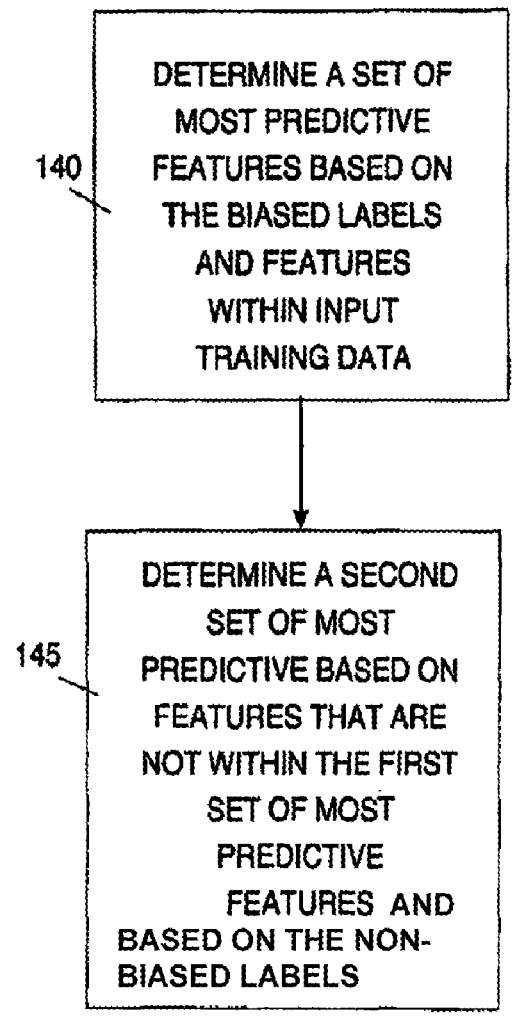
FIG. 4 is a flow diagram of an embodiment of a feature selection system of FIG. 2b.

Referring to FIGS. 2b and 4, in operation, a first set of the most predictive features 60 may be determined based on the biased labels 50 and from the feature vectors 70 within the input training data 20 (step 140). Once the first set of the most predictive features 60 is determined, a second set of the most predictive features 130 may be determined from the non-biased labels 110 and the remaining features 95 (step 145). Only the second set of most predictive features 130 and non-biased labels 110, if any, make up the output training data 115 that may be input to a machine learning phase 30.

Referring to FIG. 2b, in one exemplary embodiment, the threshold value 120 and a second threshold value 121 may be used to determine the number of features to be included within the first set of the most predictive features 60 and the second set of most predictive features 130, respectfully. The threshold values 120 and 121 may be a single number that may be equal to each other. The set of the most predictive features 60 may contain the threshold value 120 of features and the second set of most predictive features 130 may contain the threshold value 121 of features. So, for example, if the threshold value 120 were to be set to thirty-two (32) and the threshold value 121 were to be set to sixty-two (62), the set of most predictive features 60 would contain thirty-two (32) features and the second set of most predictive features 130 would contain sixty-two (62) features wherein none of the 32 features within the set 60 would be included within the 62 features of the set 130.

Referring to FIG. 2b, in another exemplary embodiment, the single, programmable threshold value 120 and 121 may represent a predictiveness value of the features to be included within the set of the most predictive features 60 and 130. So, for example, if the threshold value 120 were, for example, set to two-point-two (2.2), the set of most predictive features 60 would contain features with the predictiveness value of two-point-two (2.2) and above, as may be computed by Information Gain, Bi-Normal Separation, or some other method. And if the threshold value 121 were, for example, set to zero-point-zero-one (0.01), the set of the most predictive features 130 would contain features with the predictiveness value of zero-point-zero-one (0.01) and above, as may be computed by an Information Gain, a Bi-Normal Separation, or some other method.

Figure 2C:
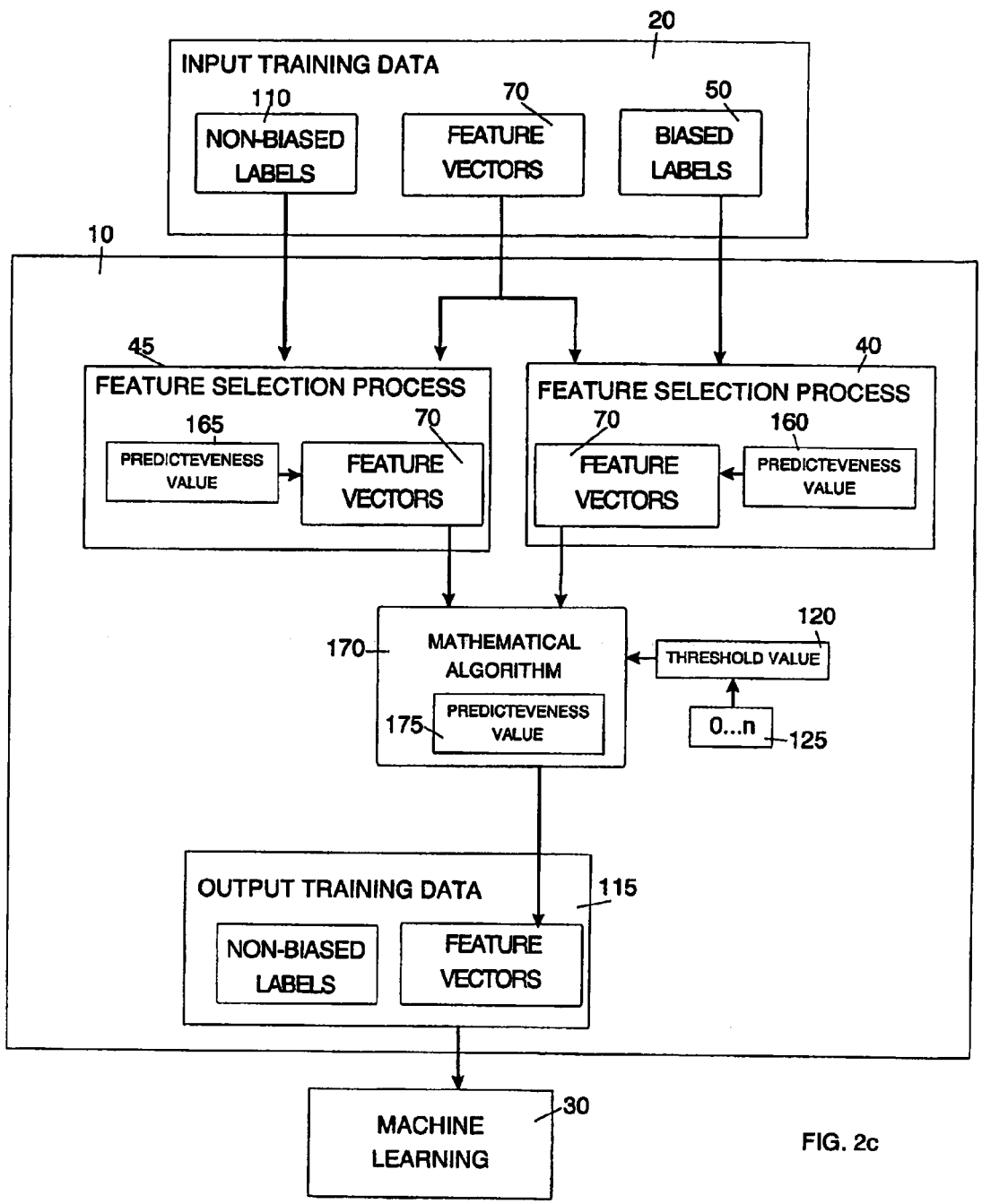

Referring to FIG. 2c, in another exemplary embodiment of the feature selection system 10, the feature selection process 40 may assign a predictiveness value 160 to each feature within the feature vectors 70 based on the biased labels 50. Feature selection process 45 may assign a predictiveness value 165 to each feature within feature vectors 70 based on the non-biased labels 110. The features within the feature vectors 70 are assigned predictiveness values 160 and 165. To prepare the output training data 115, a mathematical algorithm 170 may be applied to the predictivenes values 160 and 165 for each of the features within feature vectors 70 to assign a third predictivenes value 175 to each feature within feature vectors 70. The mathematical algorithm 115 may, for example, subtract the predictiveness values 160 from predictiveness values 165 for each feature to come up with the predictivenes value 175 for each feature. Other mathematical operations could be performed to come up with the predictivenes values 175. Subtraction is just one of many mathematical algorithms that may be implemented. The output training data 115 that may be input to a machine learning phase 30, could comprise the non-biased labels 110 and the feature vectors 70 with the predictivenes values 175. Both feature selection processes 40 and 45 may be preformed by a single algorithm like, for example, an Information Gain algorithm or a Bi-Normal Separation algorithm.

Figure 5:
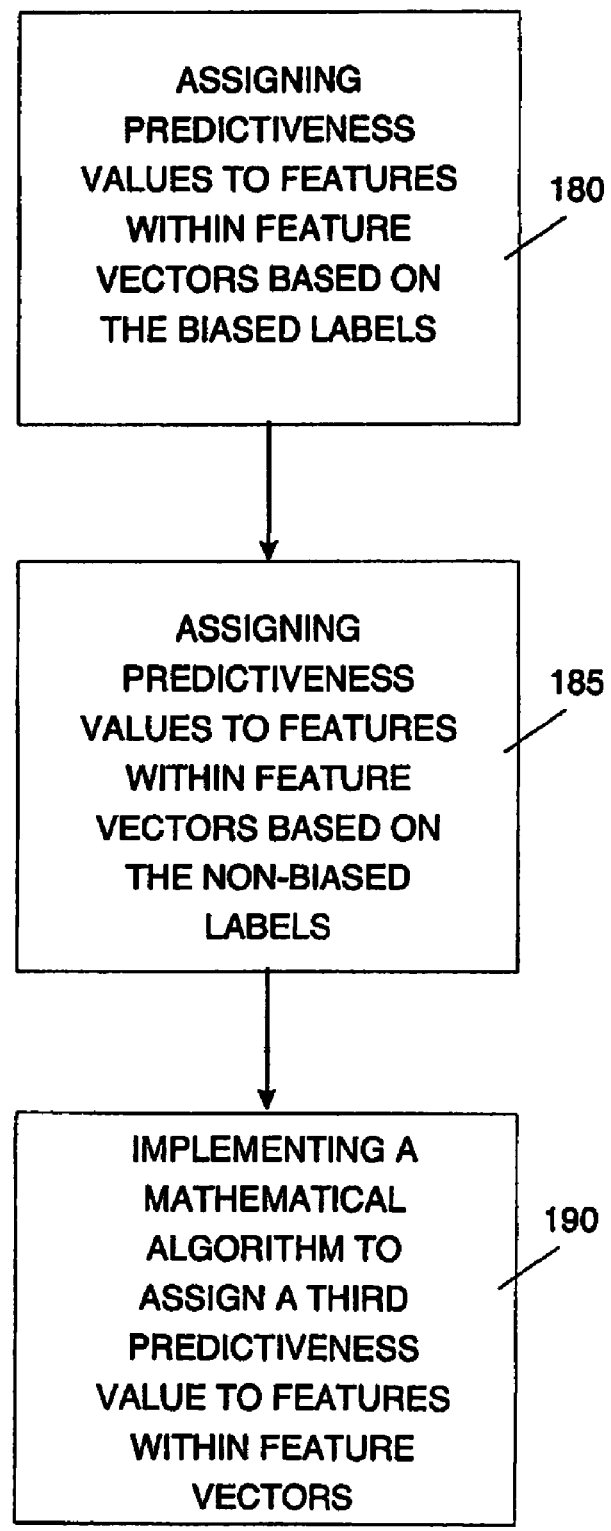
FIG. 5 is a flow diagram of an embodiment of a feature selection system of FIG. 2c.

Referring to FIGS. 2c and 5, in operation, a predictiveness value 160 may be assigned to each feature within the feature vectors 70 based on the biased labels 50 (step 180). A predictiveness value 165 may be assigned to each feature within feature vectors 70 based on the non-biased labels 110 (step 185). A mathematical algorithm may be implemented to assign predictiveness value 175 to each feature within feature vectors 70 (step 190). Once the predictiveness values 175 are assigned, the features with predictiveness values 175 and non-biased labels 110, if any, may make up the output training data 115 that may be input to a machine learning phase 30.

Referring to FIG. 2c, in one exemplary embodiment, the threshold value 120 may be used to determine the number of features with predictiveness values 175 to be input to a machine learning phase 30. The threshold value 120 may be a single number that may be programmable. The threshold value 120 of features may be input to a machine learning phase 30. So, for example, if the threshold value 120 were to be set to thirty-two (32), thirty-two (32) features with predictiveness values 175 would be input to a machine learning phase 30.

Referring to FIG. 2c, in another exemplary embodiment, the single, programmable threshold value 120 may represent a value for predictiveness value 175 of the features to be input to a machine learning phase 30. So, for example, if the threshold value 120 were, for example, set to seven-point-nine (7.9), the features with predictiveness values 175 of seven-point-nine (7.9) and above may be input to a machine learning phase 30.

Figure 6:
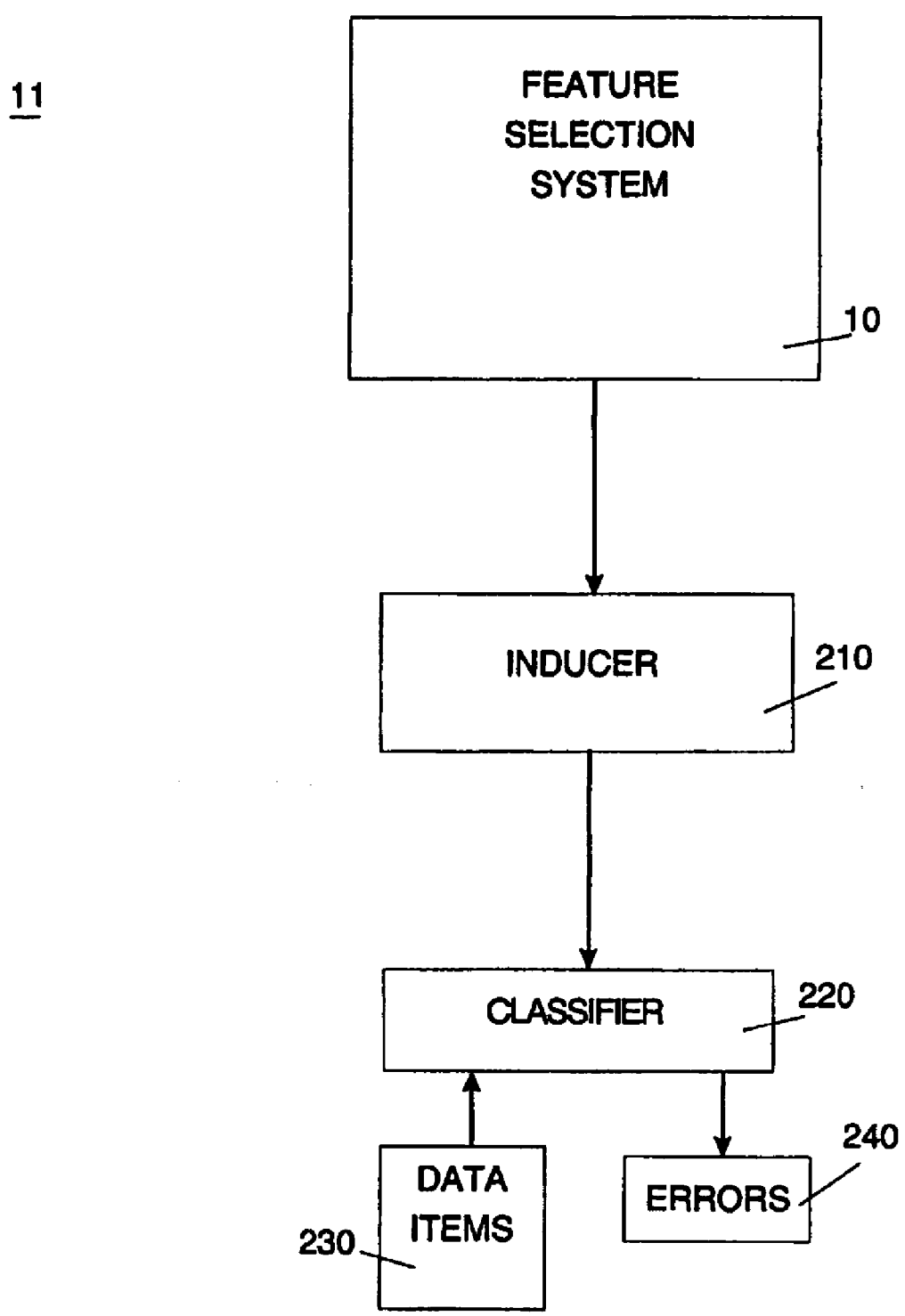
FIG. 6 is a block diagram of an exemplary embodiment of a classifier building system.

Referring to FIG. 6, in one exemplary embodiment, a classifier building system 11 may include a feature selection system 10 and inducer 210, which may, for example, generate a classifier 220 based on the output training data from feature selection system 10. The inducer 210 may be classification algorithm such as a Naïve Bayes or a Support Vector Machines, or inducer 210 may be clustering algorithms such as K-Means, or the like.

Referring to FIGS. 1, 2a, 6 and 7, in operation, a set of most predictive features 60 may be determined based on the biased labels 50 and from the feature 20 vectors 70 within the input training data 20 (step 260). Classifier 220 may be 21 generated based on the non-biased labels 110 and features that are not within the set of most predictive features 60 (step 265).

Referring to FIGS. 2b, 6 and 8, in operation, a first set of most predictive features 60 may be determined based on the biased labels 50 and from the feature vectors 70 within the input training data 20 (step 270). A second set of the most predictive features 130 may be determined from the non-biased labels 110 and the remaining features 95 (step 275). Classifier 220 may be generated based on the non-biased labels 110 and the second set of most predictive features 130 (step 280).

Figure 9:
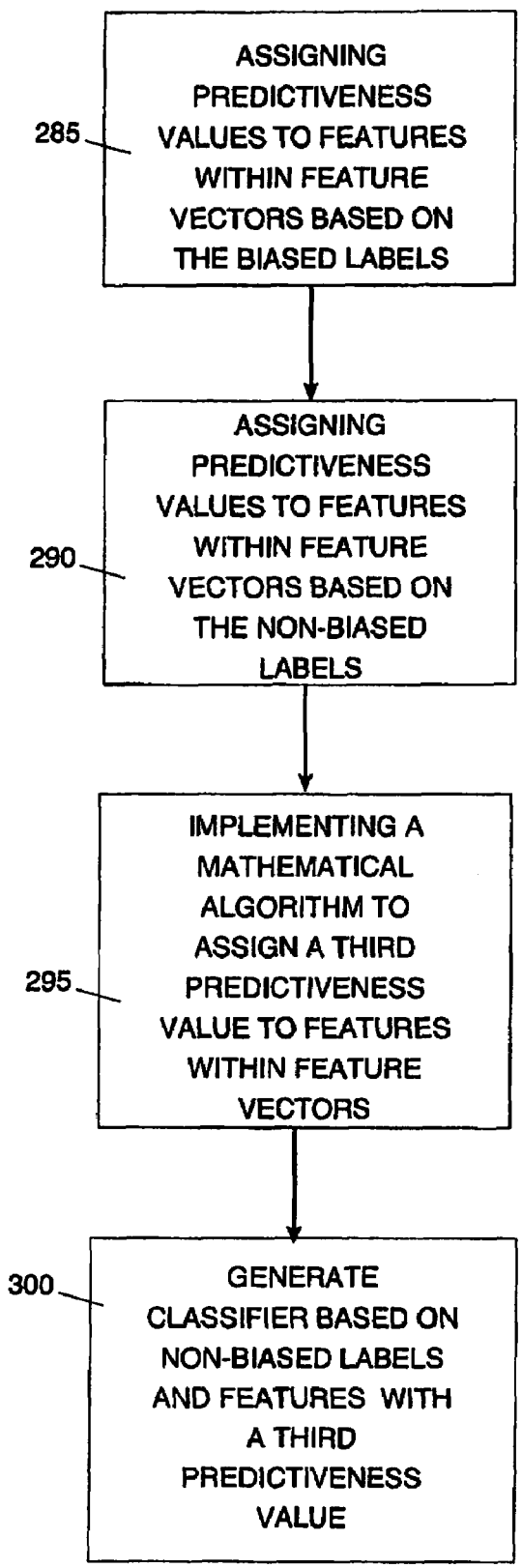
FIG. 9 is a flow diagram of the classifier building system of FIGS. 2c and 6.

Referring to FIGS. 2c, 6 and 9, in operation, a predictiveness value 160 may be assigned to each feature within feature vectors 70 based on the biased labels 50 (step 285). A predictiveness value 165 may be assigned to each feature within feature vectors 70 based on the non-biased labels 110 (step 290). A mathematical algorithm may be implemented to assign predictiveness value 175 to each feature within feature vectors 70 (step 295). Classifier 220 may be generated based on the non-biased labels 110 and features with predictiveness value 175 and above (step 300).

Referring to FIGS. 2a and 6, in one exemplary embodiment of classifier building system 11, an optimal threshold value 120 may be determined from a range of possible numbers 125. By varying the threshold value 120 within the range of possible numbers 125, the feature selection process 40 may determine a set of most predictive features 60 for each value of the threshold value 120 and inducer 210 may generate classifiers 220 for every set of output training data 115 that is generated for each threshold value 120. To determine the optimal threshold value 120, each of the generated classifiers 220 may be applied on data items 230. The classifiers 220 that produce the least number of errors 240 would yield the optimal threshold value 120.

Referring to FIGS. 2b and 6, in another exemplary embodiment of classifier building system 11, an optimal combination of the threshold values 120 and 121 may be determined from a range of possible numbers 125 and 126, respectfully. By varying the threshold value 120 within the range of possible numbers 125, the feature selection process 40 may determine a set of most predictive features 60 for each value of the threshold value 120. By varying the threshold value 121 within the range of possible numbers 126, the feature selection process 45 may determine a set of most predictive features 130 for each set of most predictive features 60 and for each value of the threshold value 121. The inducer 210 will generate classifier rules 220 for every set of the most predictive features 130. To determine the optimal combination of threshold value 120 and 121 each of the generated classifiers 220 may be applied on the test data items 230 and the classifier 220 that produces the least number of errors 240 would yield the optimal combination of threshold value 120 and 121.

Referring to FIGS. 2c and 6, in another exemplary embodiment of a classifier building system 11, an optimal threshold value 120 may be determined from a range of possible numbers 125. By varying the threshold value 120 within the range of possible numbers 125, the mathematical algorithm 170 may assign predictiveness value 175 for each value of the threshold value 120 and inducer 210 may generate classifiers 220 for every set of output training data 115 that is generated for each threshold value 120. To determine the optimal threshold value 120, each of the generated classifiers 220 may be applied on the test data items 230 and the classifiers 220 that produce the least number of errors 240 would yield the optimal threshold value 120.

Figure 10:
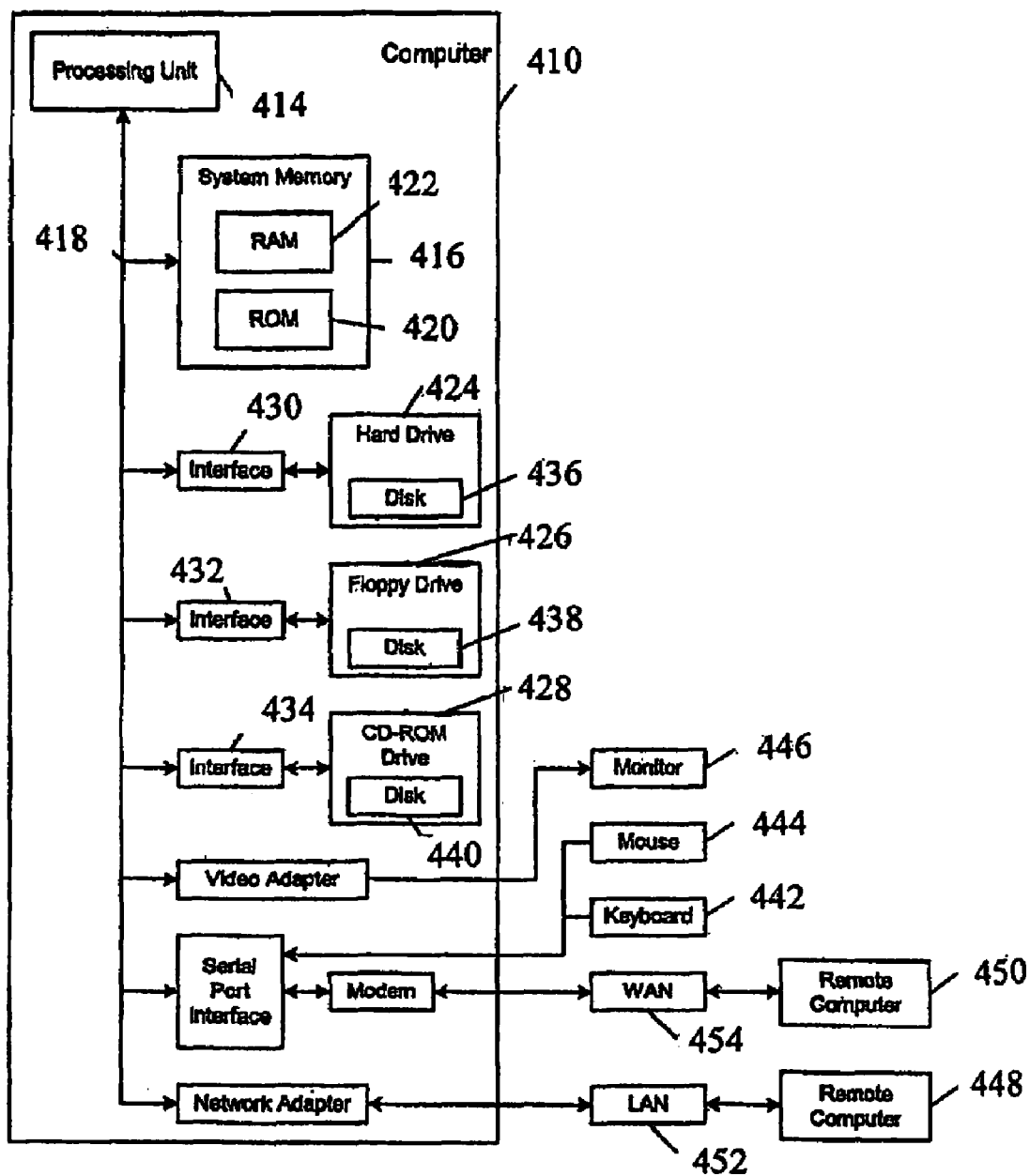
FIG. 10 is a block diagram of a computer on which feature selection system or classifier building system described herein may be performed in accordance with embodiments of the present invention.

Referring to FIG. 10, in one exemplary embodiment, feature selection system 10 and classifier building system 11 may be implemented as one or more respective software modules operating on a computer 410. Computer 410 includes a processing unit 414, a system memory 416, and a system bus 418 that couples processing unit 414 to the various components of computer 410. Processing unit 414 may include one or more processors, each of which may be in the form of any one of various commercially available processors. System memory 416 includes a read only memory (ROM) 420 that stores a basic input/output system (BIOS) containing start-up routines for computer 410, and a random access memory (RAM) 422. System bus 418 may be a memory bus, a peripheral bus or a local bus, and may be compatible with any of a variety of bus protocols, including PCI, VESA, Microchannel, ISA, and EISA. Computer 410 also includes a hard drive 424, a floppy drive 426, and CD ROM drive 428 that are connected to system bus 418 by respective interfaces 430, 432, 434. Hard drive 424, floppy drive 426, and CD ROM drive 428 contain respective computer-readable media disks 436, 438, 440 that provide non-volatile or persistent storage for data, data structures and computer-executable instructions. Other computer-readable storage devices (e.g., magnetic tape drives, flash memory devices, and digital video disks) also may be used with computer 410. A user may interact (e.g., enter commands or data) with computer 410 using a keyboard 442 and a mouse 444. Other input devices (e.g., a microphone, joystick, or touch pad) also may be provided. Information may be displayed to the user on a monitor 446. Computer 410 also may include peripheral output devices, such as speakers and a printer. One or more remote computers 448 may be connected to computer 410 over a local area network (LAN) 452, and one or more remote computers 450 may be connected to computer 410 over a wide area network (WAN) 454 (e.g., the Internet).

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. Other embodiments are within the scope of the claims. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

What is claimed is:

1. A method of machine learning, comprising:
    obtaining input training data that include a plurality of data items, individual data items within the data set including a first label, a second label and a feature vector, the feature vector specifying values for a plurality of features;
    assigning a first predictiveness value to features within the plurality of features based on the first label;
    assigning a second predictiveness value to features within the plurality of features based on the second label;
    generating a third predictiveness value for features within the plurality of features based on said first predictiveness value and said second predictiveness value;
    providing output training data that include the feature vectors, the second labels and the third predictiveness values; and
    generating a classifier by performing a machine learning process on the output training data.

2. The method of claim 1 further comprising:
    using a threshold value, to determine a number of features with said third predictiveness values that are input to the machine learning process.

3. The method of claim 1 further comprising:
    using a threshold value, wherein only features whose values of said third predictiveness value exceed equal or exceed the threshold value are input to the machine learning process.

4. The method of claim 1, wherein the first label for a given data item indicates a source of said given data item.

5. The method of claim 1, wherein the second label for a given data item comprises knowledge about a class to which said data item belongs.

6. The method of claim 1, wherein the second label indicates whether a particular data item is e-mail spam.

7. A computer-readable medium storing computer-executable process steps for machine learning, said process steps comprising:
    obtaining input training data that include a plurality of data items, individual data items within the data set including a first label, a second label and a feature vector, the feature vector specifying values for a plurality of features;

assigning a first predictiveness value to features within the plurality of features based on the first label;

assigning a second predictiveness value to features within the plurality of features based on the second label;

generating a third predictiveness value for features within the plurality of features based on said first predictiveness value and said second predictiveness value;

providing output training data that include the feature vectors, the second labels and the third predictiveness values; and generating a classifier by performing a machine learning process on the output training data.

8. The computer-readable medium of claim 7, wherein the first label for a given data item indicates a source of said given data item.

9. The computer-readable medium of claim 7, said process steps further comprising:

using a threshold value, to determine a number of features with said third predictiveness values that are input to the machine learning process.

10. The computer-readable medium of claim 7, said process steps further comprising:

using a threshold value, wherein only features whose values of said third predictiveness value exceed equal or exceed the threshold value are input to the machine learning process.

11. The computer-readable medium of claim 7, wherein the second label for a given data item comprises knowledge about a class to which said data item belongs.

12. The computer-readable medium of claim 7, wherein the second label indicates whether a particular data item is e-mail spam.

* * * * *

UNITED STATES PATENT AND TRADEMARK OFFICE
CERTIFICATE OF CORRECTION

PATENT NO.       : 7,437,334 B2                                               Page 1 of 1
APPLICATION NO.  : 11/004318
DATED            : October 14, 2008
INVENTOR(S)      : George H. Forman et al.

It is certified that error appears in the above-identified patent and that said Letters Patent is hereby corrected as shown below:

In column 6, line 22, delete "20" before "vectors".

In column 6, line 23, after "may be" delete "21".

In column 8, line 45, in Claim 2, after "value" delete ",".

In column 10, line 1, in Claim 9, after "value" delete ",".

Signed and Sealed this

Fifth Day of May, 2009

JOHN DOLL
*Acting Director of the United States Patent and Trademark Office*